(12) United States Patent
Ihs et al.

(10) Patent No.: US 9,673,710 B2
(45) Date of Patent: Jun. 6, 2017

(54) VOLTAGE REGULATOR CURRENT LOAD SENSING

(71) Applicant: Endura IP Holdings Ltd., George Town (KY)

(72) Inventors: Hassan Ihs, San Diego, CA (US); Jason Rau, San Diego, CA (US)

( * ) Notice: Subject to any disclaimer, the term of this patent is extended or adjusted under 35 U.S.C. 154(b) by 0 days.

(21) Appl. No.: 15/174,881

(22) Filed: Jun. 6, 2016

(65) Prior Publication Data

US 2016/0359413 A1    Dec. 8, 2016

Related U.S. Application Data

(60) Provisional application No. 62/171,983, filed on Jun. 5, 2015.

(51) Int. Cl.
| | |
|---|---|
| G05F 1/00 | (2006.01) |
| H02M 3/158 | (2006.01) |
| H02M 1/08 | (2006.01) |
| H02M 3/157 | (2006.01) |
| H02M 1/00 | (2006.01) |

(52) U.S. Cl.
CPC ............ *H02M 3/158* (2013.01); *H02M 1/08* (2013.01); *H02M 3/157* (2013.01); *H02M 2001/0009* (2013.01)

(58) Field of Classification Search
CPC ..... H02M 3/1588; H02M 3/156; H02M 3/157
USPC ........................................ 323/271, 282–285
See application file for complete search history.

(56) References Cited

U.S. PATENT DOCUMENTS

| | | | |
|---|---|---|---|
| 8,749,213 B2* | 6/2014 | Chen | H02M 3/1584 323/267 |
| 2006/0227861 A1* | 10/2006 | Maksimovic | H02M 3/1588 375/238 |
| 2008/0252280 A1* | 10/2008 | Prodic | H02M 3/157 323/283 |
| 2008/0266738 A1 | 10/2008 | Kimber | |
| 2011/0169470 A1 | 7/2011 | Itakura | |
| 2012/0075761 A1 | 3/2012 | Miura et al. | |

FOREIGN PATENT DOCUMENTS

| | | |
|---|---|---|
| JP | 2013-255304 A | 12/2013 |
| JP | 2014-217164 A | 11/2014 |

OTHER PUBLICATIONS

International Search Report on related PCT Application No. PCT/US2016/036104 from International Searching Authority (KIPO) dated Sep. 29, 2016.
Written Opinion on related PCT Application No. PCT/US2016/036104 from International Searching Authority (KIPO) dated Sep. 29, 2016.

* cited by examiner

*Primary Examiner* — Nguyen Tran
(74) *Attorney, Agent, or Firm* — Klein, O'Neill & Singh, LLP (57) ABSTRACT

A DC-DC converter including digital circuitry for determining load current supplied to a load. In some embodiments the digital circuitry determines the load current differently based on whether the DC-DC converter is operating in pulse frequency modulation mode or pulse width modulation mode. In some embodiments the DC-DC converter includes circuitry for determining if a short circuit or over current condition exists.

15 Claims, 5 Drawing Sheets

VOLTAGE REGULATOR CURRENT LOAD SENSING

CROSS REFERENCE TO RELATED APPLICATION

This application claims the benefit of the filing date of U.S. Provisional Patent Application No. 62/171,983, filed on Jun. 5, 2015, the disclosure of which is incorporated by reference herein.

BACKGROUND OF THE INVENTION

The present invention relates generally to power regulation, and more particularly to load current sensing in DC-DC switching converters.

DC-DC switching converters generally provide for regulated power to operational circuitry, for example integrated circuits in semiconductor devices. These integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

In many cases knowledge of magnitude of current provided to a load may be useful in adjusting converter operation, or for other purposes, for example thermal management purposes. Unfortunately, determining load current may not always be straightforward, particularly if it is desired to do so in a manner which does not require complex analog circuitry and/or circuit elements which may unduly draw power from the converter.

BRIEF SUMMARY OF THE INVENTION

Some embodiments in accordance with aspects of the invention provide a DC-DC converter comprising: a high side switch and a low side switch coupled in series, with a first end of an output inductor coupled to a node between the high side switch and the low side switch and a second end of the output inductor providing a regulated output for a load, with an output capacitor coupled to the second end of the output inductor, and a bypass switch coupling the first end and second end of the output inductor; a pulse width modulation (PWM) signal generator configured to generate a PWM signal having a duty cycle; a first comparator configured to determine if voltage of the regulated output is greater than a first predefined voltage; a second comparator configured to determine if voltage of the regulated output is less than a second predefined voltage; logic circuitry to control the high side switch, the low side switch, and the bypass switch based on at least the PWM signal; first averaging circuitry configured to determine a first average value over time of the output of the first comparator; second averaging circuitry configured to determine a second average value over time of the output of the second comparator; first evaluation circuitry configured to determine a first indication of load current based on the first average value over time of the output of the first comparator; and second evaluation circuitry configured to determine a second indication of load current based on the second average value over time of the output of the second comparator. Some embodiments in accordance with aspects of the invention provide a method useful for determining load current from a DC-DC converter, comprising: determining a first digital average of a first signal indicating whether an output voltage of the DC-DC converter exceeds a first predefined voltage; determining a second digital average of a second signal indicating whether the output voltage of the DC-DC converter is less than a second predefined voltage; if the converter is operating in a pulse frequency modulation (PFM) mode, determining a first indication of load current using the first digital average; and if the DC-DC converter is operating in a pulse width modulation mode, determining a second indication of load current using the second digital average. Some embodiments in accordance with aspects of the invention provide a method useful in operation of a DC-DC converter, comprising: determining if an output voltage of the DC-DC converter is less than a predefined under voltage threshold; setting a short circuit alarm signal if the output voltage of the DC-DC converter is determined to be less than the predefined under voltage threshold; determining if an average of the output voltage of the DC-DC converter being greater than a desired output voltage of the DC-DC converter plus a tolerance voltage is greater than a predefined value; and setting an over current alarm signal if the average of the output voltage of the DC-DC converter being greater than the desired output voltage of the DC-DC converter plus the tolerance voltage is greater than the predefined value.

These and other aspects of the invention are more fully comprehended upon review of this disclosure.

DETAILED DESCRIPTION

Figure 1:
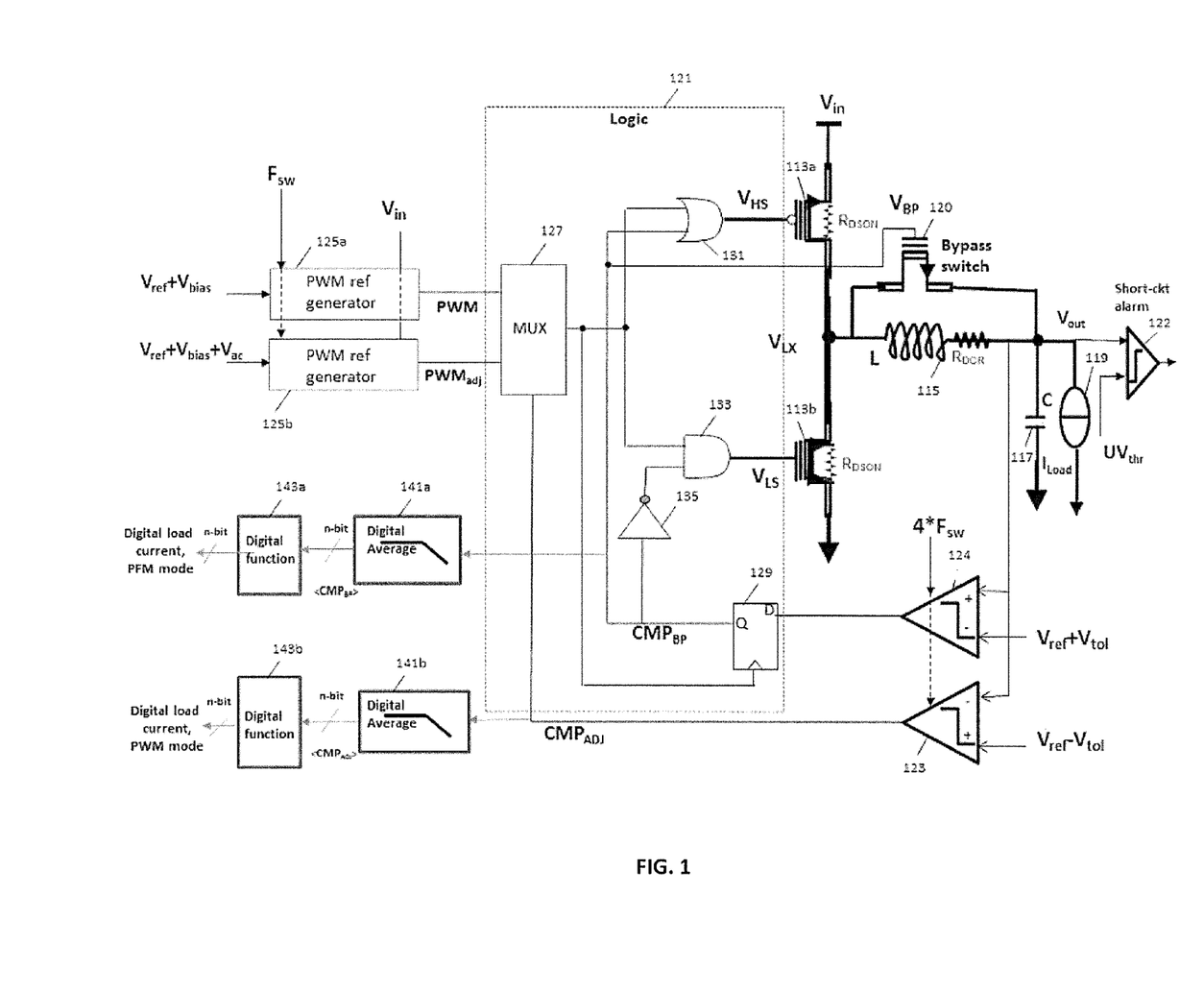
FIG. 1 is a semi-schematic, semi-block diagram of a regulated DC-DC converter in accordance with aspects of the invention.

FIG. 1 is a semi-schematic, semi-block diagram of a regulated DC-DC converter in accordance with aspects of the invention. The DC-DC converter includes circuitry, digital circuitry in various embodiments, for determining an indication of load current supplied to a load. The indication of load current may be useful in many respects, including in operation of the DC-DC converter, in determining if an over current situation exists, and in allowing for improved thermal management. In various embodiments the circuitry includes circuitry for determining whether an output voltage of the DC-DC converter is above and/or below a predefined range of voltages, for determining an average of such occurrences, and for determining an indication of load current based on the average of such occurrences.

As illustrated in FIG. 1, the converter includes a high side switch 113*a*, a low side switch 113*b*, a bypass switch 120, an output inductor 115, an output capacitor 117, a logic circuitry 121 for controlling the high side, low side, and bypass switches, a first comparator 123, a second comparator 124, a third comparator 137, a first pulse-width modulation (PWM) generator 125a, a second PWM generator 125b, a first digital average block 141a, a second digital average block 141b, a first digital function block 143a, and a second digital function block 143b.

The DC-DC converter of FIG. 1 operates the high side, low side, and bypass switches so as to regulate voltage applied to a load 119. In doing so, the converter operates the high side and low side switches either in accordance with PWM signals. In the embodiment of FIG. 1, multiple PWM generators are shown, but in many embodiments only a single PWM generator may be used. In embodiments with multiple PWM generators, PWM signals generated by either the first PWM generator 125a or the second PWM generator 125b may be selected for example based on whether an output voltage of the converter is below a predetermined magnitude, for example, as indicated by the first comparator 123. The PWM generators, and other aspects of the DC-DC converter of FIG. 1, are discussed in more detail in U.S. patent application Ser. No. 14/732,505, entitled DC-DC Converter Having Digital Control and Reference PWM Generators, filed of even date herewith, the disclosure of which is incorporated herein by reference for all purposes. The converter also operates the bypass switch, also optional in many embodiments, in accordance with an output provided by the second comparator 124 indicating whether the output voltage of the converter is above a predetermined magnitude.

Outputs of each of the comparators are also provided to the first digital average block 141a and the second digital average block 141b, respectively. The digital averages are provided to the first digital function block 143a and the second digital function block 143b, respectively, which determine an indication of load current.

Referring to FIG. 1, the high side switch 113a and the low side switch 113b are coupled in series between a first voltage source and a second voltage source. The first voltage source is at a higher voltage than the second voltage source, with the high side switch coupling the first voltage source to the low side switch, and the low side switch coupling the second voltage source to the high side switch. The high side and low side switches may be formed, for example, with metal-oxide-semiconductor field-effect transistor (MOSFET) transistors, with a p-channel MOS transistor forming the high side switch and an n-channel MOS transistor forming the low side switch. In operation, either the high side switch is active, the low side switch is active, or neither switch is active. For illustrative purposes, the high side and low side switches also show a resistance (RDSON) provided by the switches.

The output inductor 115 has one end coupled to a node between the high side switch 113a and the low side switch 113b, and also to a first end of the bypass switch 120. Another end of the output inductor is coupled to the output capacitor 117, a second end of the bypass switch 120, and the load 119, with the load current koad passing through the load. A node coupling the other end of the output inductor, the output capacitor, and the load generally may be considered the output of the DC-DC converter. For illustrative purposes, the other end of the output inductor 115 also shows a resistance (RDCR) provided by the output inductor and associated circuit paths, e.g., a parasitic effect.

The first comparator 123, the second comparator 124, and the third comparator 122 generally have a first input coupled to the output node, their second inputs coupled to reference voltages, and the comparators configured to determine which input is greater. With respect to the first comparator 123, the reference voltage, for example, may be a desired output voltage of the DC-DC converter minus a tolerance voltage. The first comparator therefore determines whether the output voltage of the DC-DC converter is less than or greater than a desired output voltage minus a tolerance voltage. With respect to the second comparator 124, the reference voltage may be the desired output voltage of the DC-DC converter plus a tolerance voltage. The second comparator therefore determines whether the output voltage of the DC-DC converter is greater than or less than the desired output voltage plus the tolerance voltage. With respect to the third comparator 137, the reference voltage may be a minimum operational voltage for the DC-DC converter. The third comparator therefore determines whether the output voltage of the DC-DC converter drops below the minimum operational voltage. Operations below the minimum operational voltage generally indicates a short circuit, and an output of the third comparator is may be provided to a short-circuit alarm to prevent a device from operating under conditions indicating a short circuit situation.

The logic circuitry 121 may receive the output signals from the first and second comparators, and the signals generated by the first and second PWM generators to control states of the high side, low side, and bypass switches. The logic circuitry 121 generally controls the states of the high side, low side, and bypass switches by way of producing control signals for controlling those switches. Referring to FIG. 1, the logic circuitry 121 includes a multiplexer 127 which receives the PWM and $PWM_{adj}$ signals, and selects one of them for use based on an output $CMP_{ADJ}$ of the first comparator 123.

As shown in FIG. 1, a latch 129 stores the signal produced by the second comparator 124. The latch stores the signal when an output of the multiplexer, indicating an end of the duty cycle of the converter switches, transitions to a high state. An output of the latch (which may be referred to as $CMP_{BP}$) is provided to a gate of the bypass switch, an OR gate 131 and, after passing through an inverter 135, to an AND gate 133. The OR gate also receives the output of the multiplexer, and provides an output to a gate of the high side switch. The high side switch, active when its gate input is low, is therefore active when both the output of the multiplexer and the output of the latch are low. The AND gate also receives the output of the multiplexer, and provides an output to a gate of the low side switch. The low side switch, active when its gate input is high, is therefore active when the inverted latch output is high and the output of the multiplexer is high.

As further shown in FIG. 1, the first digital average block 141a receives the output ($CMP_{BP}$) of the latch 129. In various embodiments, the first digital average block monitors the output $CMP_{BP}$ by way of recording the output $CMP_{BP}$ over a period of time, and generates a digital average (which may be referred to as $<CMP_{BP}>$) of the output $CMP_{BP}$ based on recorded values of the output $CMP_{BP}$. The first digital logic block 143a, in various embodiments, receives the digital average $<CMP_{BP}>$ from the first digital average block, and determines and outputs a first digital load current based on the digital average <CMPBP>. The digital average $<CMP_{BP}>$ may be considered a function of load current, a converter input voltage, the desired output voltage of the DC-DC converter, an inductance value of the output inductor, and a period of a switching frequency of the DC-DC converter. In some embodiments a correlation of <CMP$_{BP}$> and load current is determined based on DC-DC converter topology. In some embodiments the correlation of <CMP$_{BP}$> and load current is determined based on simulation and/or measurement of DC-DC converter operation under various load conditions. In some embodiments, and as later discussed with respect to FIG. 3, <CMP$_{BP}$> may be considered to be related to load current by a first order equation, for example of the form <CMP$_{BP}$>=mI$_{Load}$+b, over a load current range in which the converter operates in pulse frequency modulation mode.

Figure 3:
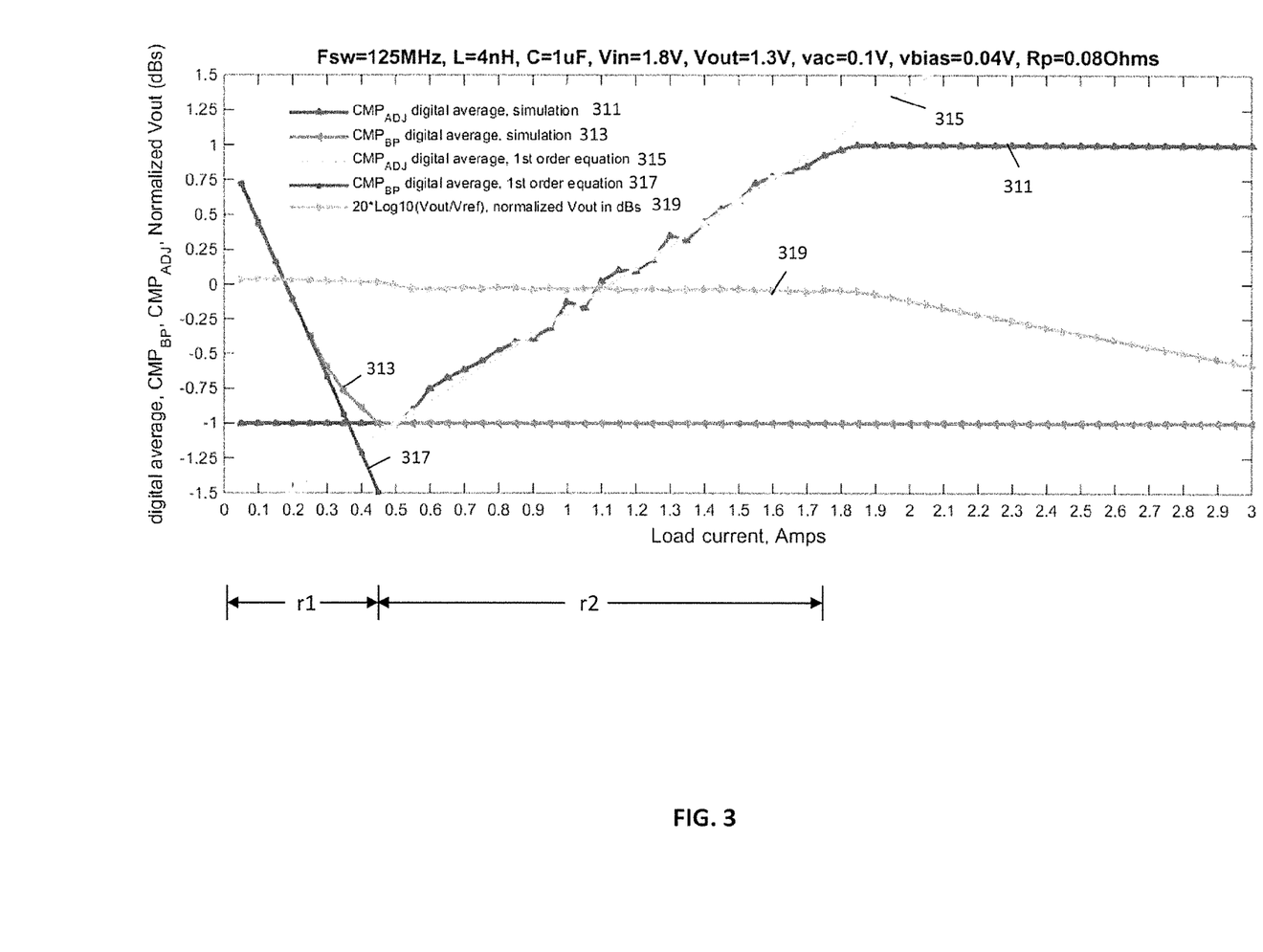
FIG. 3 provides a chart showing simulated averages of the CMPBP and CMPADJ signals with respect to load current in accordance with aspects of the invention.

Similarly, the second digital average block 141b receives the output (CMP$_{ADJ}$) of the first comparator 123. In various embodiments, the second digital average block monitors the output CMP$_{ADJ}$ by way of recording the output CMP$_{ADJ}$ over a period of time, and generates a digital average (which may be referred to as <CMP$_{ADJ}$>) of the output CMP$_{ADJ}$ based on recorded values of the output CMP$_{ADJ}$. The second digital logic block 143b, in various embodiments, receives the digital average <CMP$_{ADJ}$> from the second digital average block, and determines and outputs a second digital load current based on the digital average <CMP$_{ADJ}$>. The digital average <CMP$_{ADJ}$> may be considered a function of the second digital load current, the bias voltage, the voltage offset, and a parasitic resistance (for example of the switches and output inductor) of the DC-DC converter. As indicated by FIG. 3, in some embodiments <CMP$_{ADJ}$> may be considered to be related to load current by a first order equation, for example of the from <CMP$_{ADJ}$>=mI$_{Load}$+b, over a load current range in which the converter operates in pulse width modulation mode.

Figure 2:
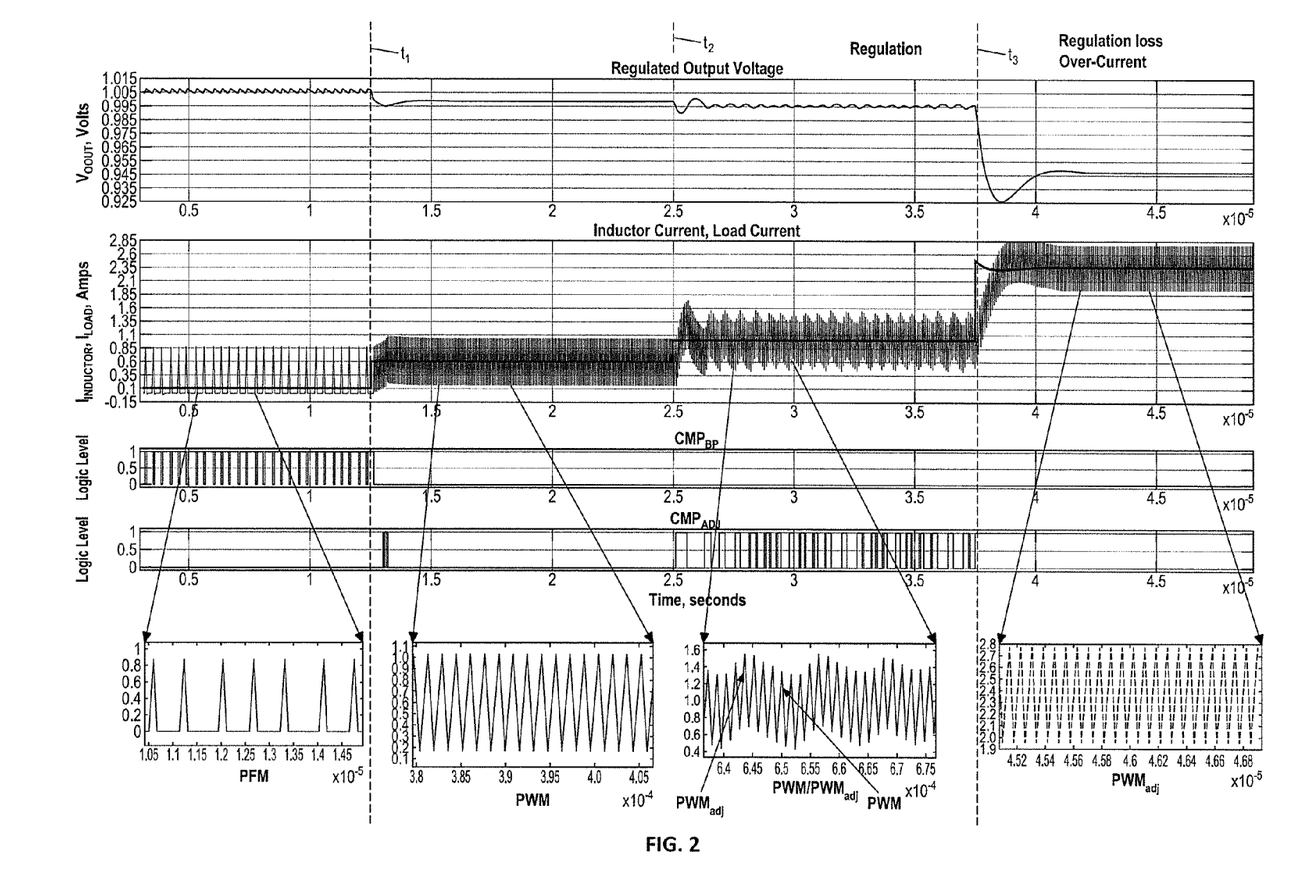
FIG. 2 provides a series of charts indicating status of a DC-DC converter in operation in accordance with aspects of the invention.

FIG. 2 provides a series of charts indicating status of a DC-DC converter, for example the DC-DC converter of FIG. 1, in operation. Each of the charts has a common time frame along their x-axis. A first chart 211 shows regulated converter output voltage and a second chart 213 shows both inductor current and load current. A third chart 215 shows status of the CMP$_{BP}$ signal, indicating an overvoltage situation in which the bypass switch is active, and a fourth chart 215 shows status of the CMP$_{ADJ}$ signal, indicating an undervoltage situation.

During a first time period, until a time t$_1$, the load is drawing little current, and the output voltage periodically overshoots desired output voltage. Consequently, the CMP$_{BP}$ signal periodically goes high, with the converter bypass switch becoming active and interrupting operation of the high side and low side switches. In such a situation, the converter is effectively operating in a pulse frequency modulation (PFM) mode, as shown in a first exploded view of the inductor current.

At time t$_1$ the load begins to draw a slightly greater amount of current, the output voltage drops slightly, and the CMP$_{BP}$ signal generally no longer goes high. In general the output voltage does not drop sufficiently to cause the CMP$_{ADJ}$ signal to go high, so the converter operates the high side and low side switches using signals from a PWM generator, which has a decreased duty cycle compared to signals from a PWM$_{adj}$ generator.

At time t2 the load begins to draw a greater amount of current. Fluctuations in the output voltage cause the CMP$_{ADJ}$ signal to alternate between high and low states, resulting in alternating operation of the high side and low side switches with signals from the PWM generator and signals from the PWM$_{adj}$ generator.

At time t3 the load begins to draw an even greater amount of current, sufficiently large that the converter does not maintain the output voltage in regulation limits. In such a circumstance, the CMP$_{ADJ}$ signal goes and stays high, and the high side and low side switches operate solely in accordance with signals from the PWM$_{adj}$ generator.

As illustrated in FIG. 2, in light loading situations, in which load current is generally low, the CMP$_{BP}$ signal periodically goes high and the DC-DC converter effectively operates in a PFM mode. Moreover, as loading increases, the CMP$_{BP}$ signal goes high less often. Also as illustrated in FIG. 2, in heavier loading situations, in which load current is generally higher, the CMP$_{ADJ}$ signal from time to time goes high, and increasingly goes high as load current increases.

FIG. 3 provides a chart showing simulated averages of the CMP$_{BP}$ and CMP$_{ADJ}$ signals with respect to load current, for a particular operating topology such as that of the embodiment of FIG. 1. For the topology of FIG. 1, the PWM generator may be considered to determine PWM duty cycles using an input voltage of a desired converter output voltage plus a bias voltage vbias, and the PWM$_{adj}$ generator may be considered to determine PWM$_{adj}$ duty cycles using an input voltage of the desired converter output voltage plus the bias voltage vbias plus an adjustment voltage vac. As shown in FIG. 3, the simulated average of the CMP$_{BP}$ signal 313 generally decreases linearly in a first region r1 of lower load current, and thereafter remains at a minimum value in a second region r2 of higher load current. The simulated average of the CMP$_{ADJ}$ signal 311, to the contrary, generally increases linearly in the second region r2 of higher load current, after being at a minimum value in the first region r1 of lower load current.

The first region r1 may be considered to overlap and/or correspond to time periods in which the converter is operating in PFM mode, as the CMP$_{BP}$ periodically goes high, as indicated by the non-minimum values of the simulated average of CMP$_{BP}$. Similarly, the second region r2 may be considered to overlap and/or correspond to time periods in which the converter is operating in PWM mode, as the CMP$_{BP}$ signal generally does not go high.

From FIG. 3, it may be seen that a first line 317 described by one first order equation largely corresponds to the simulated digital average of CMP$_{BP}$ with respect to load current, and a second line 315 described by another first order equation largely correspond to the simulated digital average of CMP$_{ADJ}$ with respect to load current. Accordingly, it is believed the digital average of CMP$_{BP}$ may be used to determine an indication of load current when the converter is operating in PFM mode, and the digital average of CMP$_{ADJ}$ may be used to determine an indication of load current when the converter is operating in PWM mode.

Figure 4:
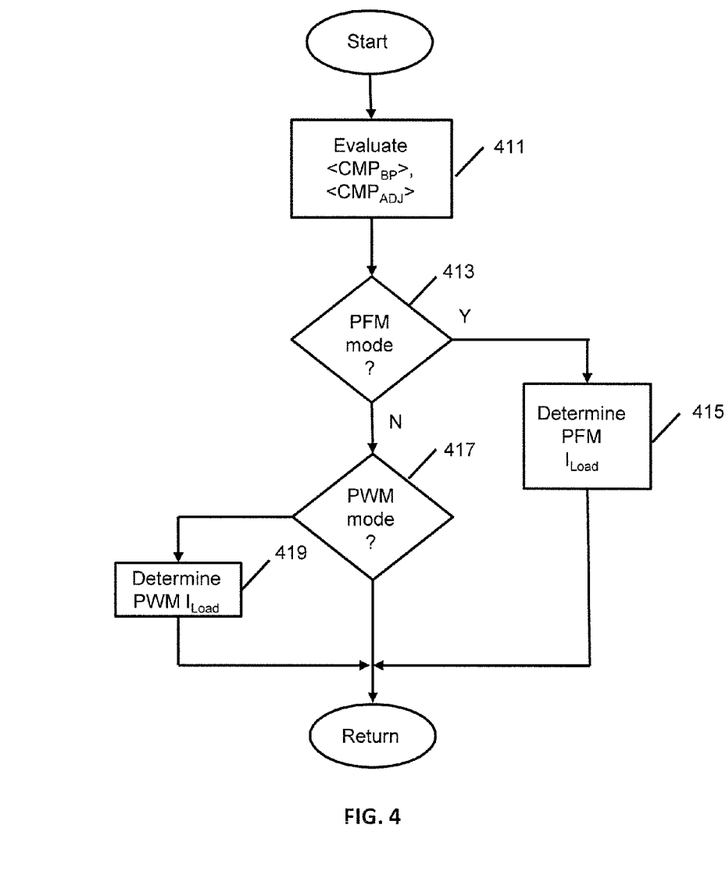
FIG. 4 is a flow diagram of a process for determining load current from a DC-DC converter in accordance with aspects of the invention.

FIG. 4 is a flow diagram of a process for determining load current from a DC-DC converter. In some embodiments the process is performed by circuitry of and/or associated with a DC-DC converter, for example the circuitry of the device of FIG. 1. In some embodiments the process is performed by digital circuitry. In some embodiments the process is performed by processor circuitry configured by program instructions.

In block 411 the process evaluates, or determines, a first digital average of a first signal indicating whether output voltage of the DC-DC converter exceeds a first predefined voltage, and evaluates, or determines, a second digital average of a second signal indicating whether the output voltage of the DC-DC converter is below a second predefined voltage. In some embodiments the digital averages are determined using a sliding or moving window over time. In some embodiments the first predefined voltage is a desired output voltage of the converter, plus an offset or tolerance voltage. In some embodiments the second predefined voltage is the desired output voltage of the converter, minus an offset or tolerance voltage. In some embodiments only one evaluation is performed, depending on for example a mode of operation of the DC-DC converter.

In block 413 the process determines if the DC-DC converter is operating in a PFM mode. In some embodiments the process determines that the DC-DC converter is operating in the PFM mode based on an external signal. In some embodiments the process determines that the DC-DC converter is operating in the PFM mode if the first digital average is larger than the second digital average. In some embodiments the process determines that the DC-DC converter is operating in the PFM mode if the first signal has provided its indication, for example has gone high, more recently than the second signal.

If the DC-DC converter is operating in PFM mode, the process continues to block 415 and determine an indication of load current using the first digital average. In some embodiments the process determines the load current using the first digital average based on a predetermined relationship between the load current and the first digital average. In some embodiment the predetermined relationship is based on a first order equation relating the load current and the first digital average. The process thereafter returns.

If the DC-DC converter is not operating in PFM mode, the process continues to block 417, although in some embodiments the process may bypass the operations of block 417 and continue directly to block 419. In addition, it should be understood that the process may also instead switch the order of operations of blocks 413-415 with those of blocks 417-419, with in some embodiments the operations of block 413 not being performed.

In block 417 the process determines if the DC-DC converter is operating in a PWM mode. In some embodiments the process determines that the DC-DC converter is operating in the PWM mode based on an external signal. In some embodiments the process determines that the DC-DC converter is operating in the PWM mode if the second digital average is larger than the first digital average. In some embodiments the process determines that the DC-DC converter is operating in the PFM mode if the second signal has provided its indication, for example has gone high, more recently than the first signal.

If the DC-DC converter is operating in PWM mode, the process continues to block 419 and determine an indication of load current using the second digital average. In some embodiments the process determines the load current using the second digital average based on a predetermined relationship between the load current and the second digital average. In some embodiment the predetermined relationship is based on a first order equation relating the load current and the second digital average. The process thereafter returns.

In some embodiments, the DC-DC converter, or other circuitry such as processing circuitry for a system-on-chip (SOC) for which the DC-DC converter is associated, monitors the second digital average, or $<CMP_{ADJ}>$, to determine if the load is being provided greater than desired load current over time. Provision of greater than desired load current over time may not be desired, for example, as such can lead to excessive thermal loading or have other deleterious effects. In some embodiments the second digital average is compared to a voltage threshold, which when executed indicates excessive provision of load current over time. In such circumstances, the DC-DC converter, for example using logic or other circuitry not illustrated in FIG. 1, may reduce extent of operation of the high side switch of FIG. 1.

Figure 5:
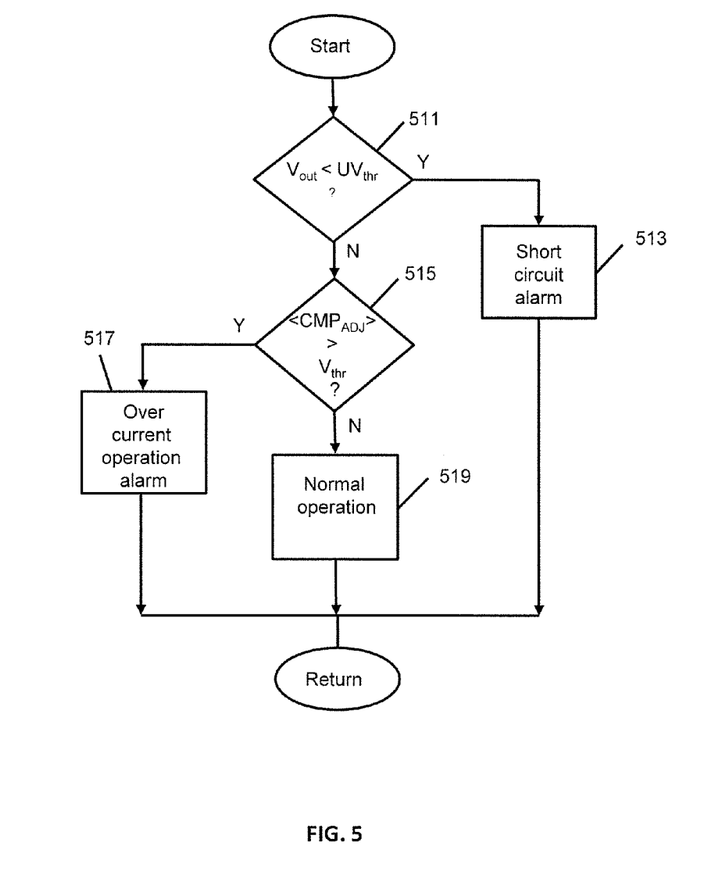
FIG. 5 is a flow diagram of a process useful in providing for over current protection by or for a DC-DC converter.

FIG. 5 is a flow diagram of a process useful in providing for over current protection by or for a DC-DC converter. In some embodiments the process is performed by circuitry of and/or associated with a DC-DC converter, for example the circuitry of the device of FIG. 1. In some embodiments the process is performed by digital circuitry. In some embodiments the process is performed by processor circuitry configured by program instructions.

In block 511 the process determines if output voltage of the DC-DC converter is less than an under voltage threshold $UV_{thr}$. In some embodiments the process determines if the output voltage is less than $UV_{thr}$ by providing both to a comparator, for example comparator 122 of the embodiment of FIG. 1. In some embodiments the voltage $UV_{thr}$ is a voltage indicating that the output voltage is at or close to a ground potential. In some embodiments the voltage $UV_{thr}$ is a predefined voltage level less than any operational voltage level expected to be observed during operation of the DC-DC converter. In some embodiments the voltage UVthr is a predefined voltage level indicating a short circuit of the DC-DC converter output or load.

If the output voltage of the DC-DC converter is less than the under voltage threshold $UV_{thr}$, the process goes to block 513. In block 513 the process sets a short circuit alarm. The short circuit alarm may, in various embodiments, be provided to a system-on-chip (SOC) processor and/or control circuitry for the DC-DC converter. In some embodiments the SOC and/or control circuitry may issue a command, or set a signal, such that the DC-DC converter ceases operation, which may be a temporary cessation of operation in some embodiments.

If the output voltage of the DC-DC converter is not less than the under voltage threshold $UV_{thr}$, the process continues to block 515. In block 515 the process determines if a) an average of the output voltage of the DC-DC converter being greater than a desired output voltage of the DC-DC converter plus a tolerance voltage b) is greater than c) a predefined value. In some embodiments the average of the output voltage of the DC-DC converter being greater than a desired output voltage of the DC-DC converter plus a tolerance voltage is the signal $<CMP_{ADJ}>$, discussed for example with respect to FIG. 1. In other words, in some embodiments, in block 515 the process determines if $<CMP_{ADJ}>$ is greater than $V_{thr}$, with $V_{thr}$ being a predefined value. In some embodiments the comparison of block 515 indicates that an undervoltage situation has been occurring for too long of an extended time, such that excessive current is being drawn from the DC-DC converter for too long of a time. Drawing of excessive current over a period of time may, for example, leading to thermal related problems with device operation.

If $<CMP_{ADJ}>$ is greater than Vthr, the process goes to block 517. In block 517 the process sets an over current alarm. The over current alarm may, in various embodiments, be provided to a system-on-chip (SOC) processor and/or control circuitry for the DC-DC converter. In some embodiments the SOC and/or control circuitry may issue a command, or set a signal, such that the DC-DC converter ceases operation, which may be a temporary cessation of operation in some embodiments.

Otherwise the process goes to block 519, and provides for normal DC-DC converter operation.

The process thereafter returns.

In some embodiments the circuitry of FIG. 1 may also be used to determine, or calibrate, values for the parasitic resistances of the high side switch, and inductor, as well as the inductance value for the inductor. For example, in some topologies <CMP$_{BP}$> is a function of parasitic resistances, but not inductor inductance, while <CMP$_{ADJ}$> is a function of inductor inductance, but not parasitic resistances. In such circumstances current to the load may be temporarily measured in a calibration mode, for example by temporarily switching a resistance of known value into the load current path, and measuring load current, to obtain load current and then using <CMP$_{BP}$> and <CMP$_{ADJ}$> to determine the parasitic resistances and inductor inductance. In some embodiments the first and second digital function blocks may include circuitry for performing this processing.

Although the invention has been discussed with respect to various embodiments, it should be recognized that the invention comprises the novel and non-obvious claims supported by this disclosure.

What is claimed is:

1. A DC-DC converter comprising:
   a high side switch and a low side switch coupled in series, with a first end of an output inductor coupled to a node between the high side switch and the low side switch and a second end of the output inductor providing a regulated output for a load, with an output capacitor coupled to the second end of the output inductor, and a bypass switch coupling the first end and second end of the output inductor;
   a pulse width modulation (PWM) signal generator configured to generate a PWM signal having a duty cycle;
   a first comparator configured to determine if a voltage of the regulated output is greater than a first predefined voltage;
   a second comparator configured to determine if the voltage of the regulated output is less than a second predefined voltage;
   logic circuitry to control the high side switch, the low side switch, and the bypass switch based on at least the PWM signal;
   first averaging circuitry configured to determine a first average value over time of an output of the first comparator;
   second averaging circuitry configured to determine a second average value over time of an output of the second comparator;
   first evaluation circuitry configured to determine a first indication of a load current based on the first average value over time of the output of the first comparator; and
   second evaluation circuitry configured to determine a second indication of the load current based on the second average value over time of the output of the second comparator.

2. The DC-DC converter of claim 1, wherein the first predefined voltage is a desired output voltage plus a tolerance voltage.

3. The DC-DC converter of claim 2, wherein the second predefined voltage is a desired output voltage minus a tolerance voltage.

4. The DC-DC converter of claim 1, wherein the first average value is a function of the load current, a converter input voltage, a desired output voltage, and an inductance value, and a period of a switching frequency.

5. The DC-DC converter of claim 1, wherein the second average value is a function of the load current, a bias voltage, a voltage offset, and a parasitic resistance.

6. The DC-DC converter of claim 1, wherein the logic circuitry is further configured to control the high side switch, low side switch, and the bypass switch based on the output of the first comparator.

7. The DC-DC converter of claim 1, wherein the first evaluation circuitry is configured to determine the first indication of the load current by assuming that the first average value is related to the load current by a first order equation.

8. The DC-DC converter of claim 1, wherein the first evaluation circuitry is configured to determine the second indication of the load current by assuming that the second average value is related to the load current by a first order equation.

9. The DC-DC converter of claim 1, wherein the first indication of the load current is the load current during a pulse frequency modulation mode operation of the high side and low side switches.

10. The DC-DC converter of claim 1, wherein the second indication of the load current is the load current during a pulse width modulation mode operation of the high side and low side switches.

11. A method useful for determining load current from a DC-DC converter, comprising:
    determining a first digital average of a first signal indicating whether an output voltage of the DC-DC converter exceeds a first predefined voltage;
    determining a second digital average of a second signal indicating whether the output voltage of the DC-DC converter is less than a second predefined voltage;
    if the converter is operating in a pulse frequency modulation (PFM) mode, determining a first indication of a load current using the first digital average; and
    if the DC-DC converter is operating in a pulse width modulation mode, determining a second indication of the load current using the second digital average.

12. The method of claim 11, wherein determining the first indication of the load current is based on a predetermined relationship between the load current and the first digital average.

13. The method of claim 12, wherein the predetermined relationship is based on a first order equation relating the load current and the first digital average.

14. The method of claim 11, wherein determining the second indication of the load current is based on a predetermined relationship between the load current and the second digital average.

15. The method of claim 14, wherein the predetermined relationship is based on a first order equation relating the load current and the second digital average.

\* \* \* \* \*

UNITED STATES PATENT AND TRADEMARK OFFICE
CERTIFICATE OF CORRECTION

PATENT NO. : 9,673,710 B2
APPLICATION NO. : 15/174881
DATED : June 6, 2017
INVENTOR(S) : Hassan Ihs and Jason Rau Page 1 of 1

It is certified that error appears in the above-identified patent and that said Letters Patent is hereby corrected as shown below:

In the Specification

In Column 3, Line 59, delete "koad" and insert --$I_{Load}$--, therefor.

In Column 4, Line 63, delete "<CMPBP>." and insert --<$CMP_{BP}$>.--, therefor.

In Column 8, Line 21, delete "UVthr" and insert --$UV_{thr}$--, therefor.

Signed and Sealed this
Ninth Day of October, 2018

Andrei Iancu
*Director of the United States Patent and Trademark Office*